United States Patent

Skelton et al.

[11] Patent Number: 6,160,388
[45] Date of Patent: Dec. 12, 2000

[54] SENSING OF CURRENT IN A SYNCHRONOUS-BUCK POWER STAGE

[75] Inventors: Dale J. Skelton, Plano, Tex.; Chao-Chih Chiu, Taipei, Taiwan; Taylor R. Efland, Richardson, Tex.

[73] Assignee: Texas Instruments Incorporated, Dallas, Tex.

[21] Appl. No.: 09/213,681

[22] Filed: Dec. 17, 1998

Related U.S. Application Data

[60] Provisional application No. 60/070,058, Dec. 30, 1997.

[51] Int. Cl.[7] ............................................. G05F 1/563
[52] U.S. Cl. ................................................... 323/282
[58] Field of Search .................................. 323/265, 282, 323/283, 284, 285, 271, 351

[56] References Cited

U.S. PATENT DOCUMENTS

| | | | |
|---|---|---|---|
| 5,410,467 | 4/1995 | Smith et al. | 363/131 |
| 5,414,341 | 5/1995 | Brown | 323/268 |
| 5,457,624 | 10/1995 | Hastings | 363/127 |
| 5,552,695 | 9/1996 | Schwartz | 323/271 |
| 5,627,460 | 5/1997 | Bazinet et al. | 323/288 |
| 5,847,554 | 12/1998 | Wilcox et al. | 323/282 |
| 5,959,441 | 9/1999 | Brown | 323/282 |
| 5,959,442 | 9/1999 | Hallberg et al. | 323/282 |
| 5,994,885 | 11/1999 | Wilcox et al. | 323/285 |

*Primary Examiner*—Adolf Deneke Berhane
*Attorney, Agent, or Firm*—W. Daniel Swayze, Jr.; Wade James Brady, III; Frederick J. Telecky, Jr.

[57] ABSTRACT

A DC-DC converter that generates a sense signal representing a voltage drop across a low-side switch when the low-side switch is on. The sense signal is inverted and stored in a "hold" capacitor until the beginning of the next switching cycle. More specifically, an input node receives an input voltage $V_{IN}$. A driver stage coupled to the input node and to a reference node chops $V_{IN}$ into a square wave under control of a PWM signal. The chopped $V_{IN}$ signal is coupled to an intermediate output node. An output stage coupled to the intermediate output node converts the chopped $V_{IN}$ signal to an output voltage $V_{OUT}$ to a load coupled to an output node. A sense unit coupled to sense a voltage on the intermediate output node generates a voltage signal indicating current flowing in the load.

12 Claims, 1 Drawing Sheet

6,160,388

SENSING OF CURRENT IN A SYNCHRONOUS-BUCK POWER STAGE

This application claims priority under 35 USC § 119(e)(1) of provisional application No. 60/070,058 filed Dec. 30, 1997.

BACKGROUND OF THE INVENTION

1. Field of the Invention

The present invention relates, in general, to integrated circuits and, more particularly, to an integrated circuit having indirect sensing of the average current in a synchronous-buck power stage.

2. Relevant Background

Switching regulators, including ripple regulators, are commonly used because of their characteristic high efficiency and high power density (i.e., power-to-volume ratio) resulting from smaller magnetic, capacitive, and heat sink components. Switching regulators indirectly regulate an average DC output voltage by selectively storing energy by switching energy on and off in an inductor. By comparing the output voltage to a reference voltage the inductor current is controlled to provide the desired output voltage.

Synchronous buck power stages are a specific type of switching regulator that use two power switches such as power MOSFET transistors to control current in the output inductor. A high-side switch selectively couples the inductor to a positive power supply while a low-side switch selectively couples the inductor to ground. A pulse width modulation (PWM) control circuit is used to control the high-side and low-side switches. Synchronous buck regulators offer high efficiency when low on-resistance power MOSFET devices are used.

In many applications it is desirable to measure the amount of current sent to a load by the regulator. This information can be used to protect the load and/or regulator circuit from damage caused by excessive current. This information can also be used to monitor the state of the load. For example, load current indicates power used by a motor and can indicate if a motor is overloaded or otherwise faulty. Load current also may indicate a circuit board with faulty connections or components.

One prior solution uses low value sense resistors placed in series with the regulator output. The load current can be monitored by sensing the voltage drop across the sense resistor. This solution increases cost of the circuit. Further, the sense resistor reduces power efficiency that both wastes energy and creates heat that must be removed from the system. Another solution uses current sensing power field effect transistors in the output stage switches. While this solution provides better power efficiency than sense resistors, it often is not cost effective. A need exists for a cost effective structure and method for sensing current in a regulator that does not require the use of sense resistors.

SUMMARY OF THE INVENTION

The present invention involves a DC-DC converter that generates a sense signal representing a voltage drop across a low-side switch when the low-side switch is on. The sense signal is inverted and stored in a "hold" capacitor until the beginning of the next switching cycle. More specifically, an input node receives an input voltage $V_{IN}$. A driver stage coupled to the input node and to a reference node chops $V_{IN}$ into a square wave under control of a PWM signal. The chopped $V_{IN}$ signal is coupled to an intermediate output node. An output stage coupled to the intermediate output node converts the chopped $V_{IN}$ signal to an output voltage $V_{OUT}$ to a load coupled to an output node. A sense unit coupled to sense a voltage on the intermediate output node generates a voltage signal indicating current flowing in the load.

DETAILED DESCRIPTION OF THE PREFERRED EMBODIMENTS

Figure 1:
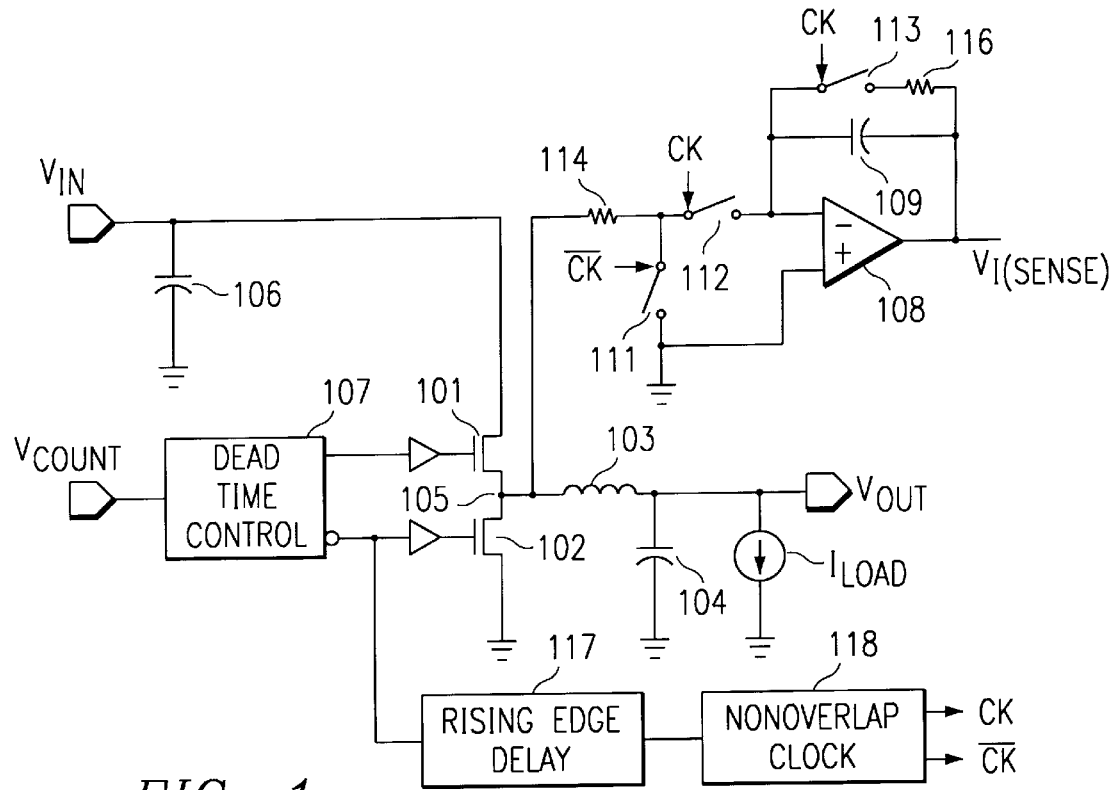
FIG. 1 schematically illustrates a portion of the present invention in a DC/DC regulator.

An embodiment of the present invention is illustrated schematically in FIG. 1. In FIG. 1, a synchronous-buck power stage is used to efficiently convert a higher DC voltage $V_{IN}$, filtered by input capacitor 106, to a lower DC voltage $V_{OUT}$. In FIG. 1, all voltages are illustrated as referenced to a ground potential. However, it should be understood that the ground potential can be equivalently substituted by a common potential that is not at earth ground. Similarly, a DC potential that is more negative than $V_{IN}$ and $V_{OUT}$ is a suitable equivalent in many applications. Accordingly, the ground node is alternatively referred to as a reference node or a reference potential herein.

In the implementation of FIG. 1, transistors 101 and 102 receive independent drive signals, from dead time control circuit 107 based upon a pulse width modulated (PWM) control signal $V_{CONT}$. The drive signals applied to transistors 101 and 102 may be buffered as shown in FIG. 1. Switches 101 and 102 chop the input DC voltage $V_{IN}$ into a square wave at node 105. This square wave is then converted into a DC voltage $V_{OUT}$ of lower magnitude by a low pass filter comprising inductor 103 and output capacitor 104.

The duty cycle of the square wave on node 105 relates the output voltage to the input voltage by the equation:

$$V_{OUT} = V_{IN} \times \frac{t_{on}}{t_{on} + t_{off}}$$

where $t_{on}$ and $t_{off}$ describe the duty cycle of the $V_{CONT}$ output to dead time control unit 107. Any available PWM control circuitry (not shown) is suitable for generating $V_{CONT}$. A basic PWM control is provided by comparing $V_{OUT}$ to a reference potential $V_{REF}$ and a pulse generated during a time that $V_{REF}$ exceeds $V_{OUT}$. Another more complex PWM circuit is described in copending U.S. Provisional Patent Application Ser. No. XXXX (Docket No. TI 26118P).

A current sense circuit comprising operational amplifier 108, hold capacitor 109, switches 111–113 and resistors 114 and 116 is coupled to node 105. Resistor 114 is coupled from node 105 to an inverting input of operational amplifier 108 through switch 112, and to ground through switch 111. A non-inverting input of operational amplifier 108 is coupled to ground. An output node of operational amplifier 108 generates a voltage $V_{I(SENSE)}$ that represents the load current $I_{LOAD}$. The output node of operational amplifier 108 is fed back to the inverting input through capacitor 109 and resistor 116 under control of switch 113.

Switch 111 is under control of an inverted clock signal labeled bar CK. Switches 112 and 113 are controlled by a non-inverted clock CK. The inverted and non-inverted clocks are generated from a low-side gate drive signal produced by dead time control circuit 107 that operatively controls transistor 102. The low side gate drive signal is applied to rising edge delay unit 117 that adds a preselected delay time to the low side gate drive signal. The delayed gate drive signal is applied to non overlap clock unit 118 that generates the clock signal and the inverted clock signal.

In operation, when a gate drive signal from dead time control 107 to low-side transistor 102 goes high to turn on transistor 102, switches 112 and 113 are turned on after switch 111 turns off. The switch transitions are delayed with respect to the gate drive signal by rising-edge delay unit 117 to allow low side transistor 102 to turn on first, to allow transistor 102 to discharge any stored charge within its integral body-drain diode.

In this state while switch 112 and switch 113 are on, operational amplifier 108 is configured as an inverting amplifier with gain equal to $R_{113}/R_{114}$; and with a filter pole determined by:

$$\frac{1}{2\pi R_{116} C_{109}}$$

The voltage on node 105 is determined by the on-resistance of transistor 102 multiplied by the load current $I_{LOAD}$. The on resistance of transistor 102 is substantially constant over a wide range of load currents. Essentially, the parasitic on-resistance of transistor 102 is used as a sense resistor replacement in accordance with the present invention. When the gate drive signal goes low to turn off transistor 102, switches 112 and 113 are opened, and switch 111 is closed. With 112 and 113 opened, operational amplifier 108 is configured as an integrator with a null input, and the voltage across capacitor 109 is held until the next switching cycle. Switch 111 shunts current flowing through transistor 102 to ground when the voltage across transistor 102 transitions high or low. Switch 111 functions to block charge from getting transferred to capacitor 109 which would otherwise cause a DC error, and transient noise.

Figure 2:
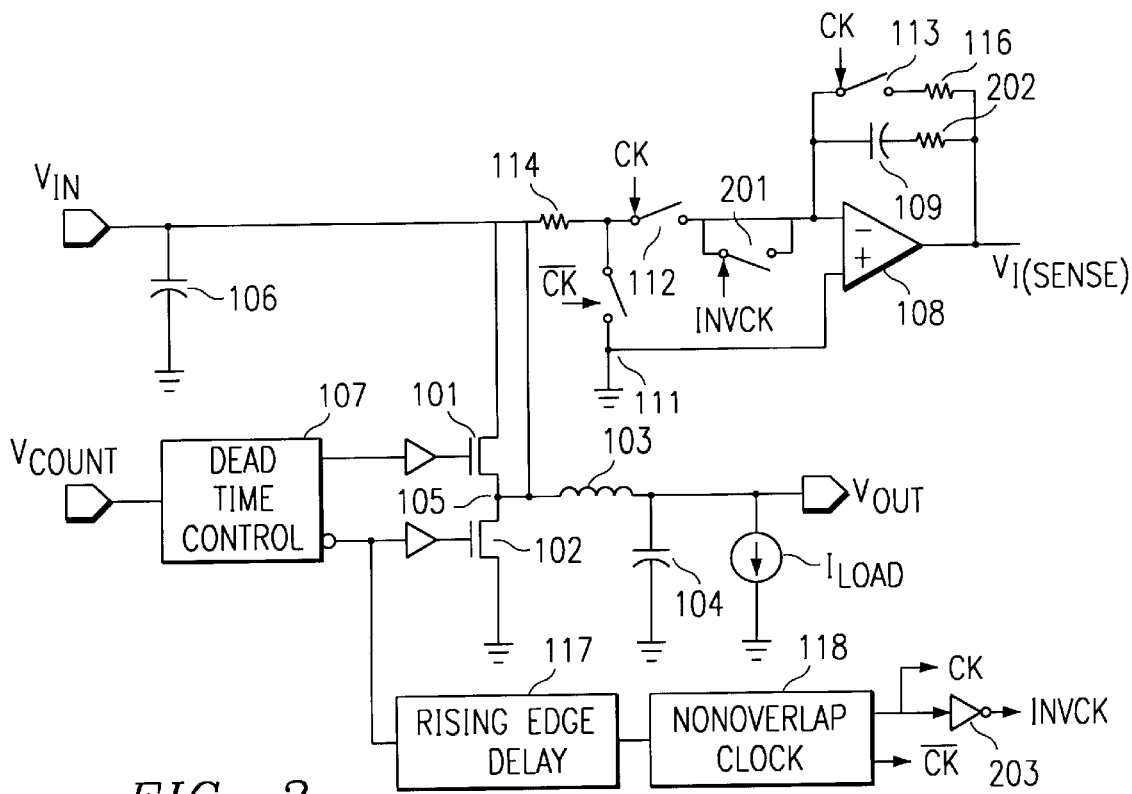
FIG. 2 shows in schematic form a DC/DC regulator in accordance with an alternative embodiment of the present invention.

One limitation of the embodiment shown in FIG. 1 is that charge may be injected into the non-inverting input of operational amplifier 108 when switch 112 and switch 113 change state. This transient charge injection can cause DC error as the charge accumulates in capacitor 109. One way to compensate for this charge injection in accordance with an embodiment shown in FIG. 2 is to connect a switch 201 to the non-inverting input of operational amplifier 108. Switch 201 is controlled by signal INVCK that is 180 degrees out of phase with the CK signal.

Charge that is injected by switch 112 and switch 113 is removed by switch 114. The effects of any injected charge can be further reduced by adding resistor 202 in series with the hold capacitor 109. Addition of resistor 202 adds a compensating zero in the main feedback loop. By making resistor 202 much smaller than (i.e. in the order of 10%) the value of $R_{116}$ or $R_{114}$ it will not impact the normal operation of the present invention described hereinbefore in reference to FIG. 1.

It is also important to drive switch 111, and switches 112 and 113 with non-overlapping clocks. Non overlap clock circuit 118 provides suitable signal separation so that CK and bar CK do not transition at the same time. If switches 111 and 112 are transitioning at the same time, charge can be removed from the S/H capacitor, 109, resulting in an error. The non-overlapping clocks eliminate this problem. In the embodiment shown in FIG. 2, the INVCK signal is generated using an inverter 203 coupled to the CK signal which ensures that CK and INVCK are in phase whereas CK and bar CK are not in phase due to the operation of non overlap clock unit 118.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A DC-DC converter comprising:
    an input node receiving an input voltage $V_{IN}$;
    a driver stage coupled to the input node and to a reference node, the driver stage coupled to chop $V_{IN}$ into a square wave under control of a PWM signal, the chopped $V_{IN}$ signal being transmitted to an intermediate output node;
    an output stage coupled to the intermediate output node to convert the chopped $V_{IN}$ signal to an output voltage $V_{OUT}$ to a load coupled to an output node;
    a pulse width modulation (PWM) control unit coupled to the output node and coupled to the driver stage for generating the PWM signal in response to the output voltage $V_{OUT}$; and
    a sense unit coupled to sense a voltage on the intermediate output node and generate a voltage signal indicating current flowing in the load;
    wherein the sense unit further comprises:
        a sample and hold unit having an output node generating the voltage signal indicating current flowing in the load; and
        a first switch coupled between a sample node of the same and hold unit and the driver stage intermediate output node, the first switch being responsive to a clock signal to selectively couple the sample and hold unit to the intermediate output node.

2. The DC-DC converter of claim 1 wherein the driver stage further comprises:
    a high side switch having a control node coupled to the PWM control unit, a first current carrying node coupled to the input node, and a second current carrying node coupled to the intermediate output node; and
    a low side switch having a control node coupled to the PWM control unit, a first current carrying node coupled to the intermediate output node, and a second current carrying node coupled to the reference node.

3. The DC-DC converter of claim 1 wherein the low side switch comprises a field effect transistor.

4. The DC-DC converter of claim 1 further comprising:
    a second switch coupled between the reference node and the intermediate output node, the second switch responsive to an out of phase clock signal to selectively shunt current flowing through drive stage to ground when chopped $V_{IN}$ signal transitions high and low.

5. The DC-DC converter of claim 1 wherein the sample and hold unit further comprises:
    a first resistor coupled between the first switch and the intermediate output node;
    an operational amplifier having a non-inverting input coupled to the reference node, an inverting input forming the sample node, and an output forming the sample and hold output node;
    a capacitor coupled from the operational amplifier output to the operational amplifier input;
    a second resistor having one end coupled to the operational amplifier output node; and a second switch coupled between another end of the second resistor and the operational amplifier inverting input node, the second switch responsive to the clock signal to selectively couple the second resistor to the inverting input node.

6. The DC-DC converter of claim 5 further comprising:

a rising edge delay unit coupled to receive the PWM signal and generate a delayed PWM signal;

a non-overlap clock unit coupled to receive the delayed PWM signal and generate the clock signal and an inverted clock signal wherein the clock signal transition is out of phase with respect to the inverted clock signal.

7. The DC-DC converter of claim 6 further comprising:

a third switch having two ends with both ends being coupled to the inverting input node, the third switch responsive to an inverted clock signal, wherein the inverted clock signal transition is in phase with respect to the clock signal.

8. The DC-DC converter of claim 7 further comprising a resistor coupled in series with the capacitor.

9. An output stage for a synchronous buck regulator comprising:

a high side switch responsive to a pulse width modulated (PWM) drive signal and having a current carrying node coupled to an intermediate output node;

a low side switch responsive to the PWM signal and having a current carrying node coupled to the intermediate output node;

an output stage coupled to the intermediate output node to convert a signal on the intermediate output node to an output voltage $V_{OUT}$ coupled through an output node to a load; and a sense unit coupled to sense a voltage across the low side switch when it is turned on and hold the sensed voltage while the low side switch is turned off;

wherein the sense unit further comprises:

a sample and hold unit having an output node generating a voltage signal indicating current flowing in the load; and a first switch coupled between a sample node of the sample and hold unit and the intermediate output node, the first switch being responsive to a clock signal to selectively couple the sample and hold unit to the intermediate output node.

10. The output stage of claim 9 wherein the low side switch comprises a power metal oxide semiconductor field effect transistor (MOSFET).

11. The output stage of claim 9 wherein the sample and hold circuit comprises:

a first resistor coupled between the first switch and the intermediate output node;

an operational amplifier having an inverting input forming the sample node, and an output forming the sample and hold output node;

a capacitor coupled from the operational amplifier output to the operational amplifier input;

a second resistor having one end coupled to the operational amplifier output node; and a second switch coupled between another end of the second resistor and the operational amplifier inverting input node, the second switch responsive to the clock signal to selectively couple the second resistor to the inverting input node.

12. The output stage of claim 9 further comprising:

a rising edge delay unit coupled to receive the PWM signal and generate a delayed PWM signal;

a non-overlap clock unit coupled to receive the delayed PWM signal and generate the clock signal and an inverted clock signal wherein the clock signal transition is out of phase with respect to the inverted clock signal.

* * * * *